(12) United States Patent
Kugo

(10) Patent No.: US 7,602,523 B2
(45) Date of Patent: Oct. 13, 2009

(54) IMAGE PROCESSING METHOD FOR RESIZING IMAGE AND IMAGE PROCESSING APPARATUS FOR IMPLEMENTING THE METHOD

(75) Inventor: Koichi Kugo, Wakayama (JP)

(73) Assignee: Noritsu Koki Co. Ltd., Wakayama-ken (JP)

( * ) Notice: Subject to any disclaimer, the term of this patent is extended or adjusted under 35 U.S.C. 154(b) by 911 days.

(21) Appl. No.: 10/974,665

(22) Filed: Oct. 26, 2004

(65) Prior Publication Data

US 2005/0134870 A1 Jun. 23, 2005

(30) Foreign Application Priority Data

Oct. 27, 2003 (JP) ............................... 2003-366131

(51) Int. Cl.
*G06F 15/00* (2006.01)
*G06K 1/00* (2006.01)

(52) U.S. Cl. .................. 358/1.2; 358/1.9; 358/533; 382/298

(58) Field of Classification Search .................. 358/1.9, 358/1.12, 450, 1.2; 382/254–275, 298, 302; 324/509

See application file for complete search history.

(56) References Cited

U.S. PATENT DOCUMENTS 6,091,513 A * 7/2000 Ishihara et al. ............... 358/1.9
6,289,133 B1 * 9/2001 Oshino ........................ 382/261
6,492,994 B2 * 12/2002 Yokouchi .................... 358/450
2001/0033388 A1 * 10/2001 Kotani ........................ 358/1.12
2002/0118019 A1 * 8/2002 Nomura ...................... 324/509

FOREIGN PATENT DOCUMENTS

| JP | 05-048881 | 2/1993 |
|---|---|---|
| JP | 06-348834 | 12/1994 |
| JP | 11-298724 | 10/1999 |

OTHER PUBLICATIONS

"Image Scaling with Two-Demensional Memory Arrasy", IBM Technical Disclosure Bulletin, IBM Corp., NY, US, vol. 34, No. 2, Jul. 1, 1991 (pp. 4, 5-9).

* cited by examiner

*Primary Examiner*—Twyler L Haskins
*Assistant Examiner*—Nicholas C Pachol
(74) *Attorney, Agent, or Firm*—Fulbright & Jaworski LLP

(57) ABSTRACT

An image processing apparatus for resizing image data by a determined desired magnification. The apparatus includes an image data inputting section for inputting the image data, a magnification determining section for determining a magnification based on the image size of the inputted image data and the print size, a magnification converting section for converting the determined desired magnification into a combination of a first reduction ratio including 100% magnification, an expansion ratio and a second reduction ratio including 100% magnification, a first image reducing section for reducing the image data by the first reduction ratio by using an averaging operation, an image expanding section for expanding the resultant reduced image data by the expansion ratio by using an interpolating operation, and a second image reducing section for reducing the resultant expanded image data by the second reduction ratio by using an averaging operation.

7 Claims, 6 Drawing Sheets

| M | 1/N1 | R | 1/N2 |
|---|---|---|---|
| 1.299 | 1/1 | 1.299 | 1/1 |
| 1.249 | 1/1 | 1.249 | 1/1 |
| 1.199 | 1/1 | 2.398 | 1/2 |
| 1.149 | 1/1 | 2.298 | 1/2 |
| 1.099 | 1/1 | 2.198 | 1/2 |
| 1.049 | 1/1 | 2.098 | 1/2 |
| 0.999 | 1/1 | 1.998 | 1/2 |
| 0.949 | 1/1 | 1.898 | 1/2 |
| 0.899 | 1/1 | 1.798 | 1/2 |
| 0.849 | 1/1 | 1.698 | 1/2 |
| 0.799 | 1/1 | 1.598 | 1/2 |
| 0.749 | 1/1 | 1.498 | 1/2 |
| 0.699 | 1/1 | 1.398 | 1/2 |
| 0.649 | 1/1 | 1.298 | 1/2 |
| 0.599 | 1/1 | 1.198 | 1/2 |
| 0.549 | 1/1 | 1.098 | 1/2 |
| 0.499 | 1/2 | 1.996 | 1/2 |
| 0.449 | 1/2 | 1.796 | 1/2 |
| 0.399 | 1/2 | 1.596 | 1/2 |
| 0.349 | 1/2 | 1.396 | 1/2 |
| 0.299 | 1/3 | 1.794 | 1/2 |
| 0.249 | 1/4 | 1.992 | 1/2 |
| 0.199 | 1/5 | 1.990 | 1/2 |
| 0.149 | 1/6 | 1.788 | 1/2 |
| 0.099 | 1/10 | 1.980 | 1/2 |
| 0.049 | 1/20 | 1.960 | 1/2 |

92

IMAGE PROCESSING METHOD FOR RESIZING IMAGE AND IMAGE PROCESSING APPARATUS FOR IMPLEMENTING THE METHOD

BACKGROUND OF THE INVENTION

1. Field of the Invention

The present invention relates to an image processing method for resizing (expanding/reducing) image data to a determined desired magnification, and more particularly to a method of resizing photographic image data. The invention relates also to an image processing apparatus for implementing this method.

2. Description of the Related Art

Image data generated by an image data acquiring device such as a digital camera, a scanner vary in size significantly. For reproducing such data in the form of a hard copy, e.g. for obtaining a print of such data, there are generally defined so-called print sizes. Therefore, it is necessary to effect resizing (expansion/reduction) on the image data in advance so as to suit a certain desired print size. In doing this, in case the image data comprise photographic image data, basically the resizing operation is done in such a manner as to maintain its aspect ratio.

In the art of image reduction, e.g. the Japanese Patent Application "Kokai" No. 5-48881 (paragraphs [0005] to [0010] and FIG. 1) proposes a solution for simplifying hardware construction required therefor. In this, rather than reducing the image data to a desired magnification in a single stage, the reduction process is divided into two stages. In the first stage, the image data is reduced to $\frac{1}{2^n}$ (n: an integer including 0), then, in the second stage, this image data reduced to $\frac{1}{2^n}$ is further reduced to the desired magnification $\alpha$ ranging between 1 and $\frac{1}{2}$, thus obtaining $(\frac{1}{2^n}) \times \alpha$ reduced image data. That is, in this technique, image data reduced in advance to $\frac{1}{2^n}$ is reduced subsequently to the desired magnification $\alpha$. Therefore, although this technique employs the apparently limited magnification of 1 to $\frac{1}{2}$, by setting (n) to 0, a reduction ratio of 1 to 0.5 can be obtained; by setting (n) to 1, a further reduction ration of 0.5 to 0.25 can be obtained; and by setting (n) to 2, a still further reduction ratio of 0.25 to 0.125 can be obtained, respectively. As a result, this technique allows a wide range of reduction operation. In this, (first) resizing means for resizing to the intermediate magnification of $\frac{1}{2^n}$ can be easily realized simply by using a shift register. Also, as second resizing means for resizing the image data to a desired final magnification of 1 to $\frac{1}{2}$, this second resizing means needs to provide only such limited reduction ratio and needs to process only three pixels as reference pixels. Then, e.g. a coefficient generating circuit for effecting coefficient calculation according to each magnification can be simple, so that the entire circuit construction can be simple as well. However, this conventional image reducing technique does not contemplate any means for preventing occurrence of striped pattern on the outputted image, commonly known as "moire". Hence, in the case of certain reduction ratios, moire appears conspicuously, which can result in image quality deterioration which is critical in the case of e.g. a photographic print in particular.

As an image processing technique attempting to cope with this problem, according to the Japanese Patent Application "Kokai" No. 11-298724 (paragraphs [0004] to [0005] and FIG. 1), first, a magnification: r designated by a magnification designating means is converted into separate elements: $p^{-n}$ and $\alpha$, where p is a natural number, n is an integer including 0, and the coefficient $\alpha$ is $1 \leq \alpha < p$. Then, an image reducing means effects a reduction operation on image data inputted thereto for the reduction to $p^{-n}$. Next, an image expanding means expands the reduced data to the magnification of $\alpha$. This technique is based on a concept that occurrence of moire phenomenon can be avoided if the image reducing means effects an arithmetic averaging operation involving all pixels constituting the image data. However, even with this image resizing technique, it has been found that in the case of e.g. quality photographic print output, the moire phenomenon occurs, in certain magnifications, in such a degree as to result in image quality deterioration.

SUMMARY OF THE INVENTION

In view of the above-described state of the art, a primary object of the present invention is to provide an improved image resizing technique capable of reliably restricting moire phenomenon in outputted image, in various magnifications.

For accomplishing the above-noted object, according to the present invention, there is proposed an image processing method for resizing (expanding/reducing) image data to a determined desired magnification, the method comprising the steps of:

converting the determined desired magnification into a combination of a first reduction ratio including 100% magnification, an expansion ratio and a second reduction ratio including 100% magnification;

reducing the image data by the first reduction ratio by using an averaging operation;

expanding the resultant reduced image data by the expansion ratio by using an interpolating operation; and reducing the resultant expanded image data by the second reduction ratio by using an averaging operation.

In the present invention, for its image resizing operation, there is employed the linear interpolation technique, the cubic interpolation technique, etc. In the linear interpolation, pixel values of expanded/reduced pixels located at four points about a target pixel are employed for the calculation. In the cubic interpolation, expanded/reduced pixel values of expanded/reduced pixels located at sixteen points about the target pixel are employed for the calculation. In the case of effecting high-ratio reduction, some pixels remain unused in the interpolation calculation, thus moire phenomenon can occur. In view of this, according to the present invention, the image resizing process is divided into the three steps. Then, the averaging operation is employed respectively in the image reductions at the first step and the final step of the three steps and the interpolating operation is employed in the intermediate step for image data expansion. With this, even if there exist some pixels not used in the interpolation operation, as the steps before and after this operation effect the averaging operations involving all pixels constituting the image data, occurrence of moire phenomenon can be restricted. Incidentally, the reason why each reduction operation employs a reduction ratio including 100% magnification is that in certain special magnifications, at these reduction steps before and after the interpolation operation, even at 100% magnification, i.e. with no reduction operation at all, no moire generation is observed, so that the interpolation operation for image expansion alone will be sufficient.

When the determined desired magnification M is converted into the combination of the expansion ratio for use in the image expansion operation using the interpolating operation and the reduction ratios for use in the image reduction operations using the averaging operation, according to one preferred embodiment of the present invention, said first reduction ratio is 1/N1 (N1 is a natural number), said second reduction ratio is 1/N2 (N2 is a natural number) and said expansion ratio is R=M×N1×N2; and in the case of the magnification M being 1.2 or more, N2 is set to 1; in the case of the magnification M being below 1.2, N2 is set to 2, respectively. This is based on the present inventors' finding that when the magnification M is 1.2 or more, even if the reduction operation at the final step is effected by 100% magnification, that is, even if this reduction operation is omitted at all, moire will not be generated so conspicuously as to result in appreciable image quality deterioration. On the other hand, when the magnification M is below 1.2, the image reduction operation with the reduction ratio of 1/2 which is the simplest possible reduction operation is effected for reducing the image data with involving all pixels thereof, thereby to effectively restrict moire phenomenon occurrence.

According to one preferred embodiment of the present invention, values of said first reduction ratio, said expansion ratio and said second reduction ratio converted from the determined desired magnification are tabulated in advance. With this additional feature, upon determination of the magnification, the respective values of the first reduction ratio, the expansion ratio and the second reduction ratio are retrieved from a so-called lookup table. Hence, the conversion operation of the magnification can be simplified.

The present invention relates also to a program for causing a computer to implement the above-described image resizing method as well as to a medium storing such program.

According to still further aspects of the present invention, there are provided an image processing apparatus and a photographic printing system both employing the above-described method. In particular, the photographic printing system according to the present invention includes an image data inputting section for inputting photographic image data and a print outputting section for outputting a photographic image based on the inputted photographic image data in the form of a photographic print of a selected print size. Further, for realizing the image resizing function according to the present invention, this photographic printing system comprises:

a magnification determining section for determining a magnification based on the image size of the inputted photographic image data and the print size;

a magnification converting section for converting the determined desired magnification into a combination of a first reduction ratio including 100% magnification, an expansion ratio and a second reduction ratio including 100% magnification;

a first image reducing section for reducing the image data by the first reduction ratio by using an averaging operation;

an image expanding section for expanding the resultant reduced image data by the expansion ratio by using an interpolating operation; and a second image reducing section for reducing the resultant expanded image data by the second reduction ratio by using an averaging operation.

Needless to say, with the above-described photographic printing system having the image resizing function, all advantageous functions and effects achieved by the above-described image resizing method can be achieved also. Further, if this system employs the additional feature that said first reduction ratio is 1/2 (N1 is a natural number), said second reduction ratio is 1/N2 (N2 is a natural number) and said expansion ratio is R=M×N1×N2; and in the case of the magnification M being 1.2 or more, N2 is set to 1; in the case of the magnification M being below 1.2, N2 is set to 2, respectively, then, as described hereinbefore, in spite of the simple construction relating to the image resizing function, image resizing operations at such magnifications as often employed in making photographic prints, can be effected without moire phenomenon leading to image quality deterioration.

Further and other features and advantages of the present invention will become apparent upon reading the following detailed description of the preferred embodiments thereof with reference to the accompanying drawings.

DESCRIPTION OF THE PREFERRED EMBODIMENTS

Preferred embodiments of the present invention will be described in details with reference to the accompanying drawings.

Figure 1:
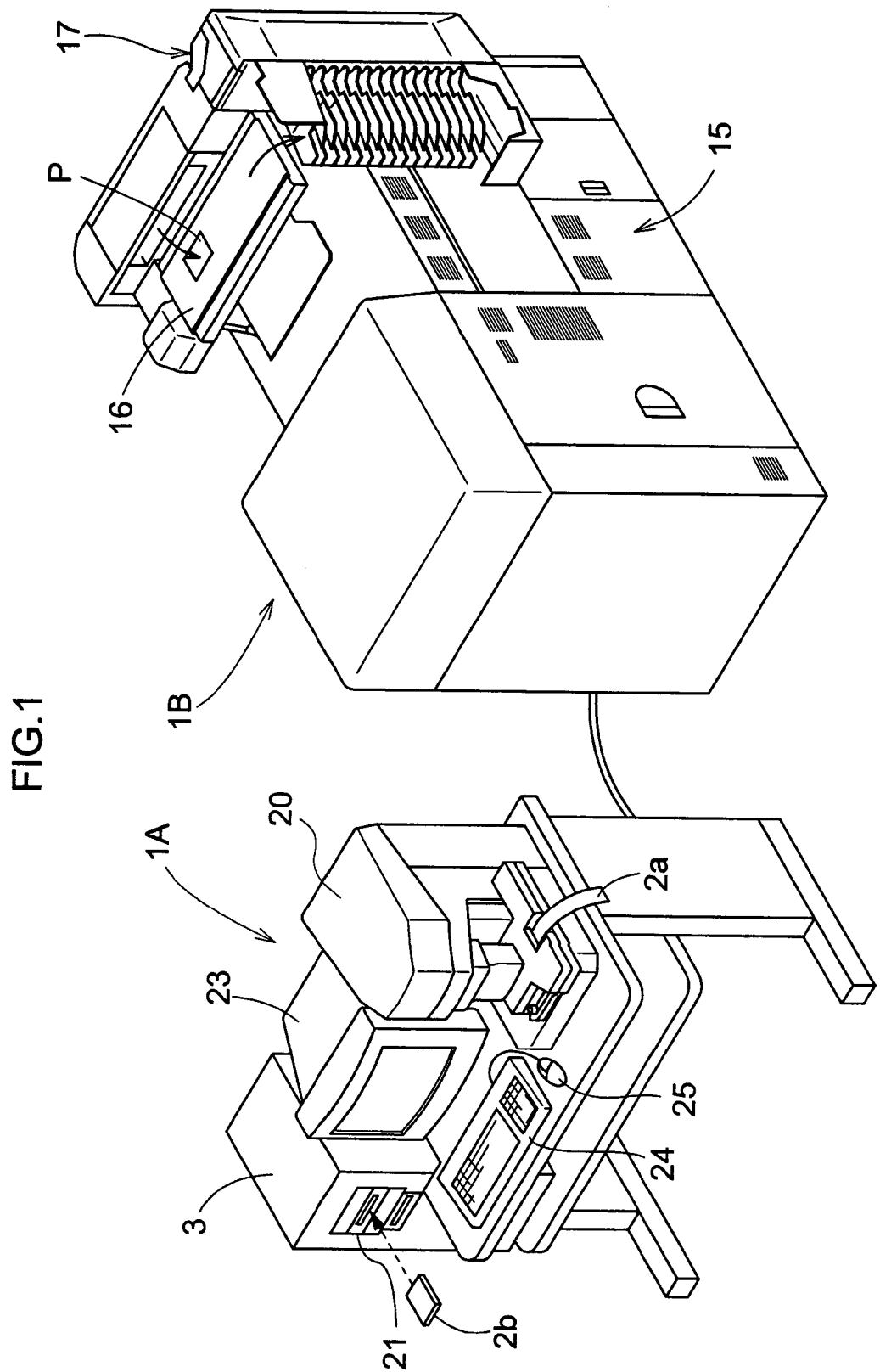
FIG. 1 is a view showing an outer appearance of a photographic printing system employing the resizing technique according to the present invention.

FIG. 1 shows an outer appearance of a photographic printing system employing the image resizing technique of the present invention. As shown, this printing system consists mainly of a printing station 1B as a photographic printer for effecting exposure and development on a print paper P and an operating station 1A for processing photographic images taken from a developed photographic film 2a or various image input media such as a memory card 2b for a digital camera and effecting production/transmission of print data to be used in the printing station 1B.

Figure 2:
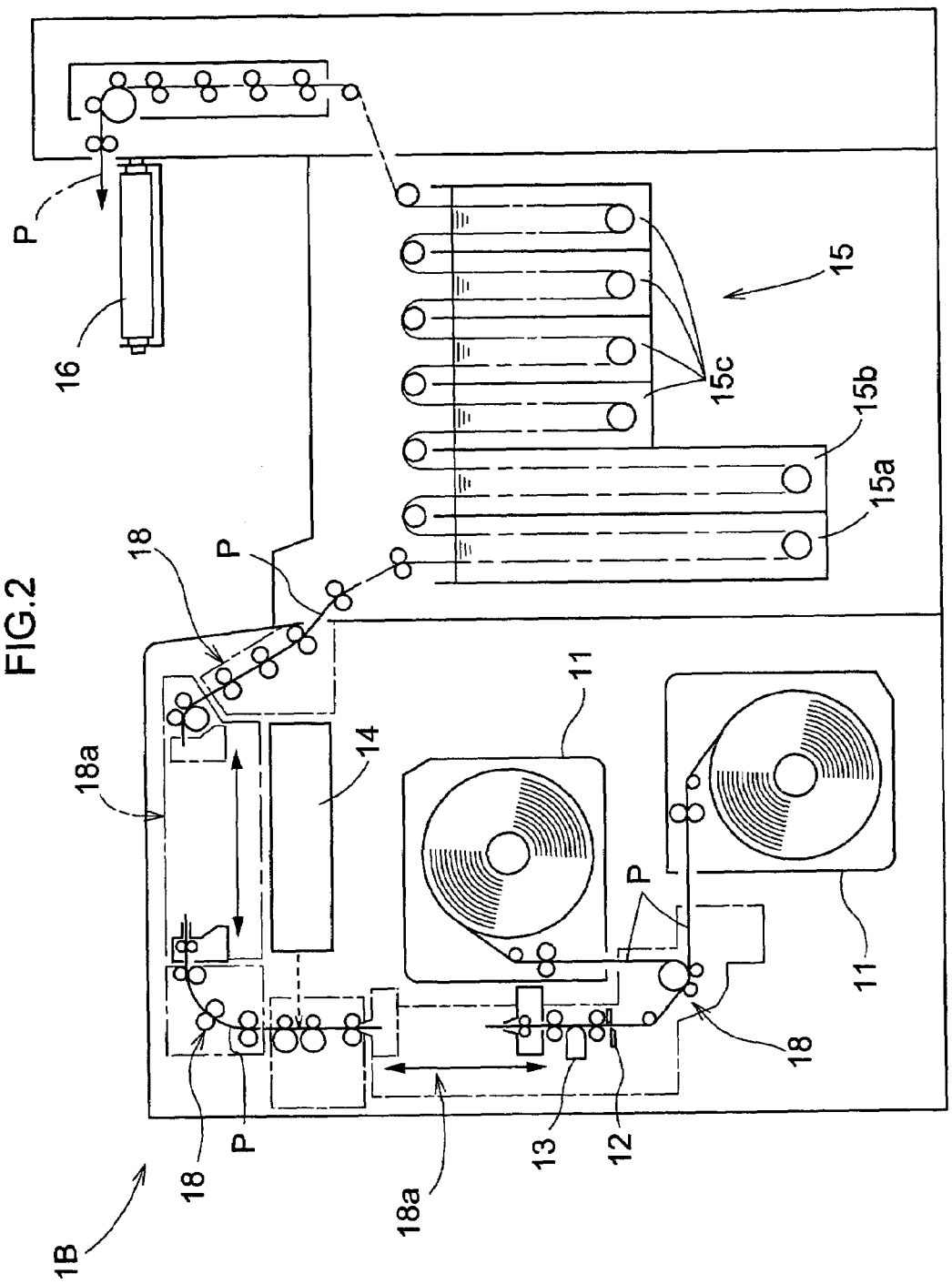
FIG. 2 is a diagram schematically showing a construction of a print station of the photographic printing system.

This photographic printing system is known also as "digital mini-labo". As best understood from FIG. 2, in the printing station 1B, a print paper P stored in the form of a roll in either one of two print paper magazines 11 is drawn out and cut by a sheet cutter 12 to a print size strip. On this print paper P (or print size strip), a back printing unit 13 prints on its back face, color correction information and various print processing information such as a frame number, and a print exposing unit 14 exposes a front face of each paper P with a photographically recorded image. Then, a plurality of such exposed print papers P are fed into a developing tank unit 15 having a plurality of developing solution tanks for their development. After being dried, the developed print papers P are conveyed by a transverse conveyer 16 to a sorter 17, by which the papers P are sorted according to each customer's order and stacked in a plurality of trays (see FIG. 1).

For transporting the print papers P at a speed adapted or suited for each of the above-described various operations, there is provided a print paper transporting mechanism 18. This print paper transporting mechanism 18 has a plurality of pinch transport roller pairs including chucker type print paper transport units 18a disposed before and after the print exposing unit 14 relative to the print paper transporting direction.

The print exposing unit 14 has line exposure heads for effecting irradiation of laser beams of three primary colors, R (red), G (green) and B (blue) along a main scanning direction of the print paper P which is being transported in a sub scanning direction, based on the print data sent from the operating station 1A. The developing solution tank unit 15 includes a color developing solution tank 15a whish stores therein color developing solution, a bleaching/fixing solution tank 15b which stores therein bleaching/fixing solution and stabilizing solution tanks 15c which store stabilizing solutions therein.

At an upper position of a desk-like console of the operating station 1A, there is disposed a film scanner 20 for obtaining photographic image data ("image data" hereinafter) from the respective photographically exposed frames of the photographic film 2a. Whereas, a media reader 21 for obtaining image date from various types of semiconductor memories, CD-R or the like is incorporated within a general-purpose personal computer which functions as a controller 3 for this photographic printing system. The general-purpose PC is connected also to a monitor 23 for displaying various kinds of information and a keyboard 24 and a mouse 25 which function as operation input devices (pointing devices) employed as an instruction inputting section when various settings or adjustments are to be effected.

Figure 3:
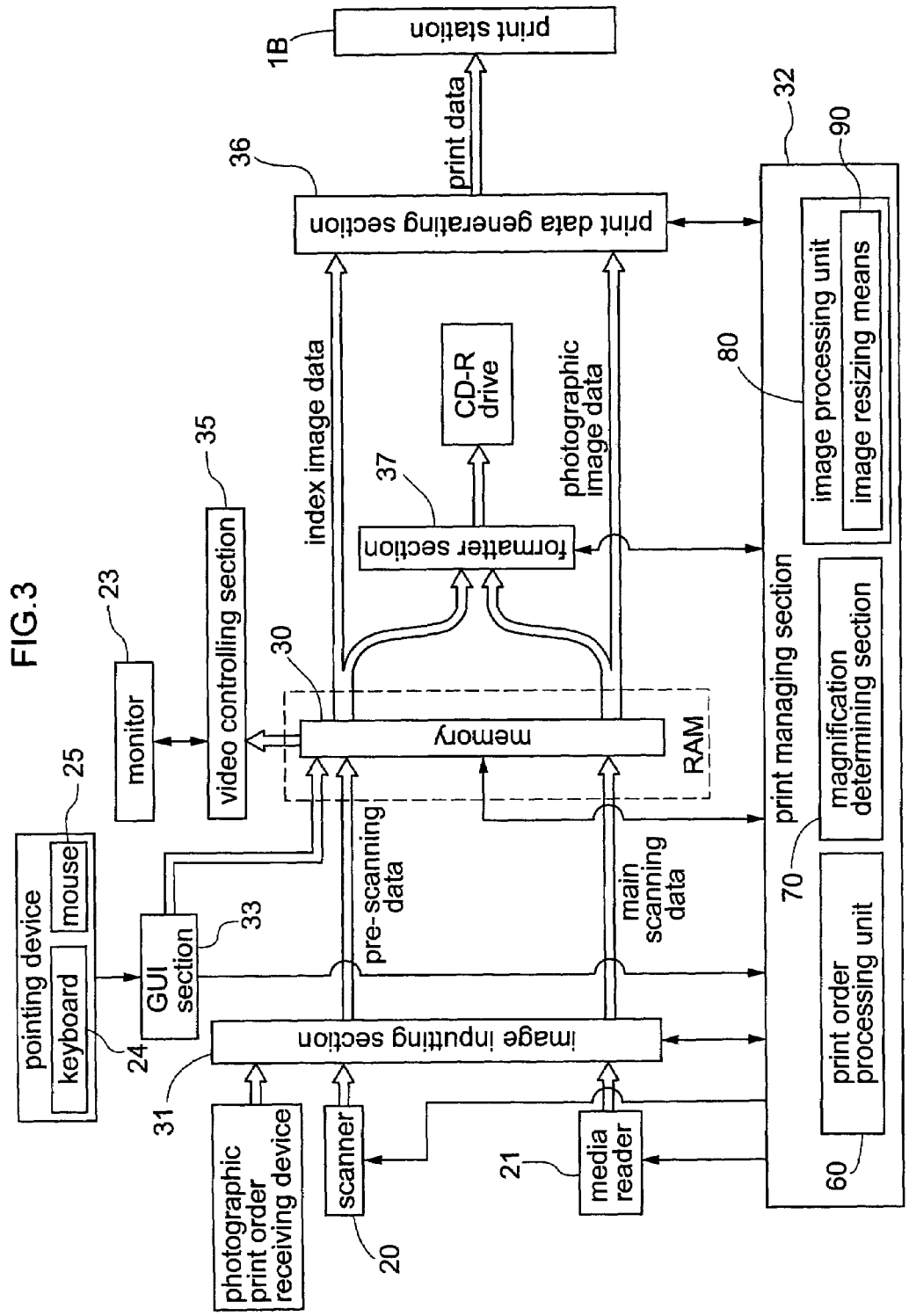
FIG. 3 is a functional block diagram for illustrating functional blocks or sections provided in a controller of the photographic printing system.

The controller 3 for the photographic printing system includes a CPU as a core component thereof and includes also various functional blocks or sections for effecting various operations of the photographic printing system realized in the form of hardware and/or software. Of these functional sections, as shown in FIG. 3, the following sections are of particular relevance to the present invention. An image inputting section 31 is provided for inputting the image data read by the scanner 20 or the media reader 21 and effecting any preparatory operation needed for a subsequence process. A GUI section 33 constitutes a graphic user interface (i.e., GUI) configured for creating a graphically assisted operation screen having various windows, various operation buttons or the like and generating control commands from user's operation inputs (via the keyboard 24, the mouse 25 or the like) effected through such graphic operation screen. A print managing section 32 effects, e.g., an image processing operation on the image data transmitted from the image inputting section 31 to a memory 30 in order to generate desired print data according to a control command sent from the GUI section 33 or an operation command directly inputted via, e.g., the keyboard 24. A video controlling section 35 generates wide signals for causing the monitor 23 to display a print source image or a simulated image as an expected finished print image during a pre-judge printing operation for, e.g., color correction and to display also the graphic data sent from the GUI section 33. A print data generating section 36 generates print data suited for the print exposing unit 14 mounted in the print station 1B, based on final image data whose image processing has been completed. A formatter section 37 formats raw image data or the finally processed image data into a format writable in, e.g., a CD-R, in accordance with a customer's request.

Referring more particularly to the image inputting section 31, in case the photographic image recording media is a film 2a, this image inputting section 31 transmits scanned data scanned in a pre-scanning mode and a main scanning mode, separately to the memory 30, to effect a preparatory operation suited for each particular purpose. Whereas, in case the photographic image recording media is a memory card 2b, if the inputted image data contains thumbnail image data (low resolution data), the section 31 transmits this thumbnail data to the memory 30 separately from the main data (high resolution data) of the photographic image, so that the thumbnail data may be used for e.g. list (summary) display on the monitor 23.

On the other hand, if no thumbnail data are contained therein, the image inputting section 31 creates reduced images from the main data and sent these as thumbnail data to the memory 30. Further, this image inputting section 31 is connected also to a device commonly known as photographic print order receiving device for automatically receiving a customer's order for prints. Then, when the image inputting section 31 receives print order data relating to a print size, a number of prints to be made, etc., image attribute data relating to photographic condition and image data, the image inputting section 31 transmits the image data to the memory 30, and transmits the print order data and the image attribute data to the print managing section 32, respectively. In the case of an order for standard photos, then, the print order data relating to e.g. a print size, the number of prints, etc. will be sent to the print managing section 32 in response to an operator's input operation to that effect via e.g. the keyboard 24.

The print managing section 32 includes a print order processing unit 60 for managing the print size, the number of prints, etc., a magnification determining section 70 for determining a magnification based on the image size of the inputted photographic image data and the print size, and an image processing unit 80 for effecting photo retouching operations such as color correction, filtering (for color softening or sharpness adjustment) on the image data mapped in the memory 30. The image processing unit 80 includes an image resizing means 90 employing the technique proposed by the present invention.

Figure 4:
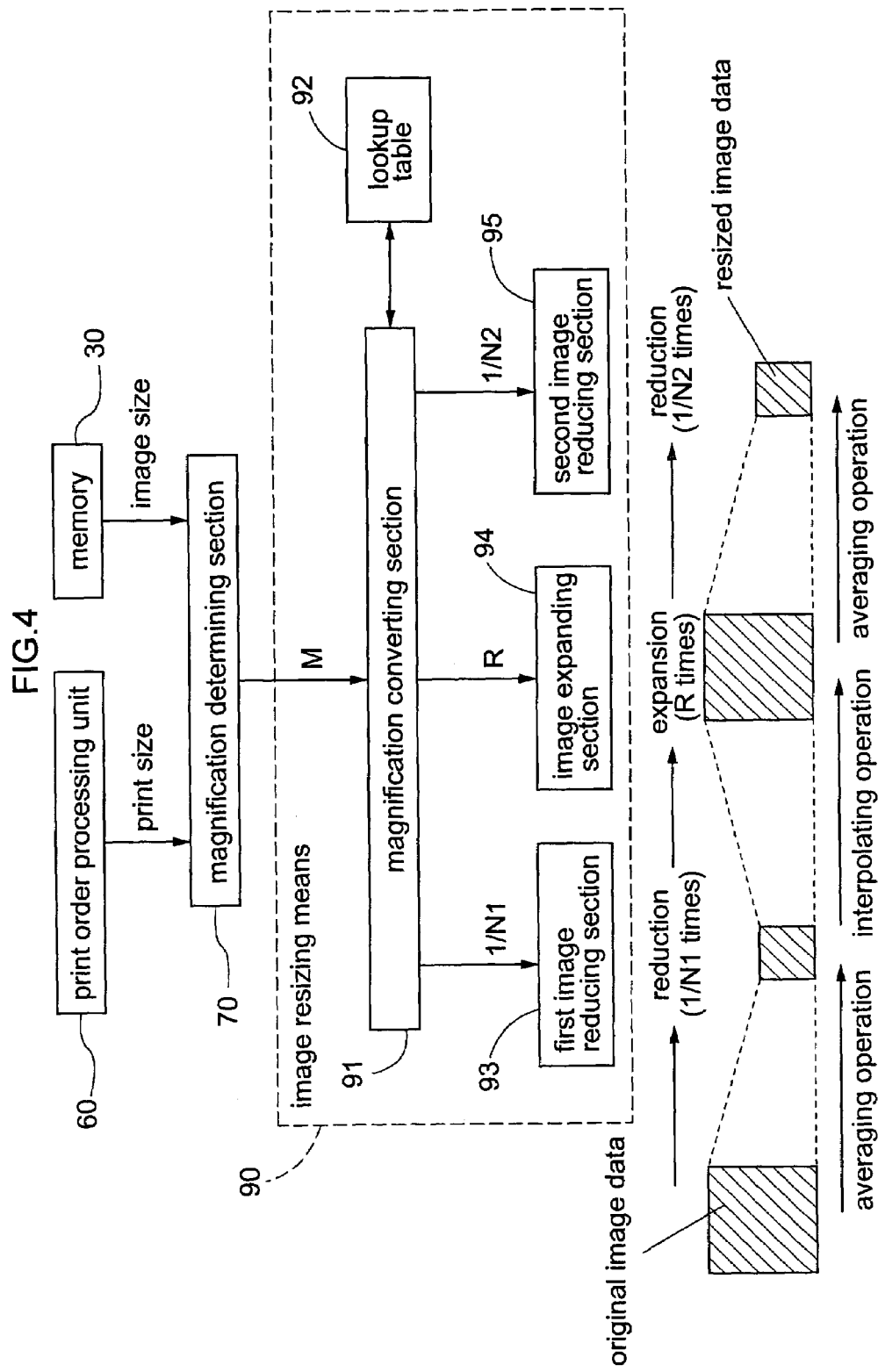
FIG. 4 is a block diagram showing functional blocks of an image resizing means.

The image resizing means 90, as shown in FIG. 4, includes a magnification converting section 91 for converting the determined desired magnification determined by the magnification determining section 70 into a combination of a first reduction ratio including 100% magnification, an expansion ratio and a second reduction ratio including 100% magnification, a first image reducing section 93 for reducing the image data by the first reduction ratio by using an averaging operation, an image expanding section 94 for expanding the resultant reduced image data by the expansion ratio by using an interpolating operation, a second image reducing section 95 for reducing the resultant expanded image data by the second reduction ratio by using an averaging operation, and a lookup table 92 storing, in the form of a table therein, various combinations (sets) of the first reduction ratio, the expansion ratio and the second reduction ratio in correlation with various magnifications.

Figure 5:
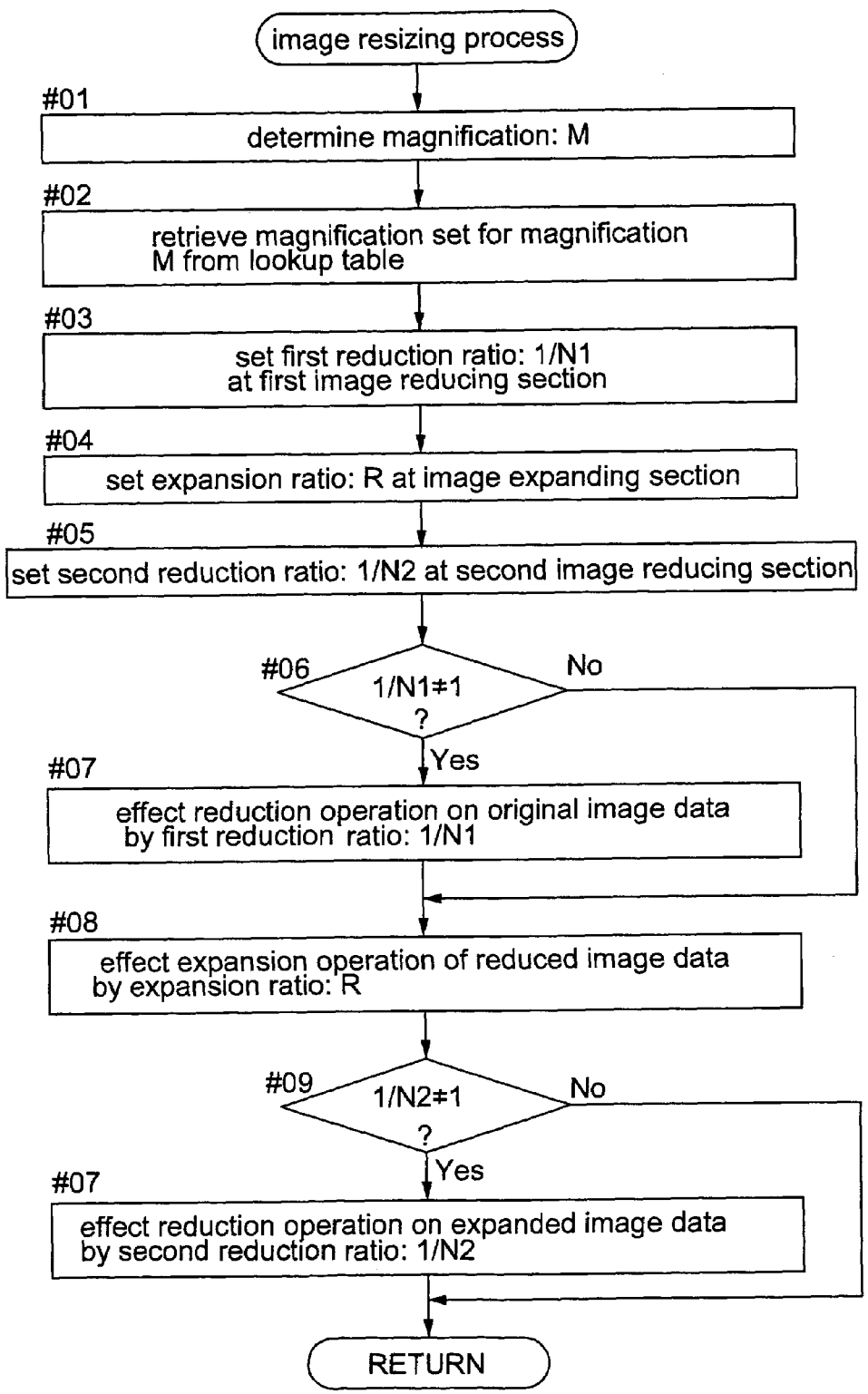
FIG. 5 is a flowchart illustrating an image resizing process.

Next, the process of image resizing operation by the image resizing means 90 having the above-described construction will be explained in details with reference to the flowchart of FIG. 5.

Figures 6, 7:
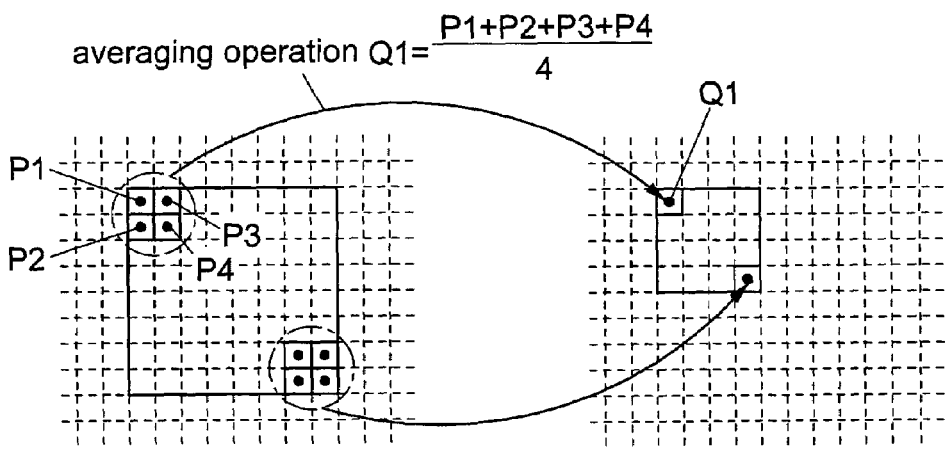
FIG. 6 is an explanatory view of a lookup table registering sets of magnification therein.
FIG. 7 is an explanatory view schematically illustrating a reduction operation using an averaging operation.

First, based on the image size of the image data mapped in the memory 30 through the image inputting section 31 and the print size set by the print order processing unit 60, the magnification determining section 70 determines a magnification for this image data (a reduction ratio in the case of image reduction or an expansion ratio in the case of image expansion) (step #01). Upon this determination of magnification: M, the magnification converting section 91 makes an access to the lookup table 92 to retrieve therefrom a particular set of magnification (reduction and expansion ratios) correlated with this magnification: M. (step #02). More particularly, in this lookup table 92, as shown in FIG. 6, for each particular magnification M, there is registered a combination (set) of a first reduction ratio: $1/N1$, an expansion ratio: R, and a second reduction ratio: $1/N2$. For example, to a magnification: M=1.199, there are allotted a first reduction ratio: $1/N1=1/1$, an expansion ratio: R=2.398 and a second reduction ratio: $1/N2=1/2$. To magnification: M=0.449, there are allotted a first reduction ratio: 1/N1=1/2, an expansion ratio: R=1.796 and a second reduction ratio: 1/N2=1/2. The sizes of inputted image data are generally determined, since the specifications of the film scanner 20 and the digital cameras are standardized to a certain degree. And, the resolutions of the print exposing section 14 are also predetermined in the field of photographic print. For this reason, magnifications which can be used are almost predictable. So that, various sets of magnification (first reduction ratio 1/N1, expansion ratio R and second reduction ratio 1/N2) can be registered in advance. Needless to say, in the case of an unregistered magnification, a registered magnification similar thereto will be used with change of only the expansion ratio in its set. In this way, the first reduction ratio 1/N and the second reduction ratio 1/N2 are always set as reciprocals of natural numbers, thereby to allow the image reduction operations to utilize the averaging operation.

FIG. 7 is a diagram illustrating the reduction operation using the arithmetic averaging operation. As shown, the process effects an averaging operation on all pixel values (density values) of a plurality of pixels (four pixels constituting a square in the figure) constituting the original image data, thus obtaining an average value. Then, this obtained average value is set as a pixel value of one pixel in the new image data, i.e., the image data reduced by the reduction ratio 1/2 to 1/4 in its area. With this reduction operation utilizing the averaging operation using a reciprocal of a natural number, all pixels of original image data are used for creating new image data. Therefore, moire generation can be restricted.

Incidentally, in the magnification sets registered in the lookup table 92, only in the case of special case where the magnification M exceeds 1.2, the first reduction ratio and the second reduction ratio both are set as 100% magnifications, meaning no reduction operations being effected in such case. This is because of the observation made that in such magnifications, no conspicuous moire generation occurs. Further, in the field of photographic print, effecting photographic printing by expanding original image data can be said as an exceptional operation. Further, the first reduction ratio M becomes 100% magnification when the magnification M exceeds 0.5. This is because of the observation that by effecting a reduction operation by way of an averaging operation after the magnification by a real number using the interpolation technique, no conspicuous moire generation occurs. Therefore, the main purpose of the reduction operation using the first reduction ratio is not to significantly increase the expansion ratio used in the subsequent expansion operation. For, such large expansion ratio would invite disadvantageous increase in the calculation load in the expansion operation using the interpolating technique.

Upon retrieval of a set of magnification for a predetermined magnification, the magnification converting section 91 sets the first reduction ratio 1/N1 at the first image reducing section 93 (step #03), sets the expansion ratio R at the image expanding section 94 (step #04) and sets the second reduction ratio 1/N2 at the second image reducing section 95 (step #05). The actual image resizing operation on the image data mapped in the memory 30 is carried out in the order of the reduction operation at the first image reducing section 93, the expansion operation at the image expanding section 94 and then the reduction operation at the second image reducing section 93. In this process, the reduction operations include 100% magnification, i.e. no reduction operation. Therefore, the process checks this prior to each reduction operation. Namely, the process checks whether the first reduction ratio 1/N1 is 1 or not (step #06). If not 1, then, the above-described image reduction utilizing the arithmetic averaging operation using the first reduction ratio 1/N1 is effected at the first image reducing section 93 (step #07). Whereas, if 1, then, this image reduction by the first image reducing section 93 will be omitted.

Next, the image expanding section 94 effects the image expansion utilizing the interpolation technique using the expansion ratio R (step #08). The image expansion operation using the interpolation technique is well-known in the art. Therefore, details thereof are omitted herein. Main specific techniques thereof include the linear (by-linear) interpolation technique, and the cubic (by-cubic) interpolation technique. In the instant embodiment, one of these interpolation techniques can be selectively employed.

Upon completion of the image expansion operation, the process checks whether the second reduction ratio 1/N2 is 1 or not (step #09). If not 1, then, the second image reducing section 95 effects the image reduction utilizing the averaging operation using the second reduction ratio 1/N2 (step #10). Whereas, if 1, then, this reduction operation by the second image reducing section 95 will be omitted.

In this way, the image data which have been subjected to the image resizing operation will be then subjected to a necessary image processing and then converted into print data to be transmitted to the print exposing unit 14, which then exposes a print paper P based on this print data, thereby to produce a finished print.

In the foregoing embodiment, there is employed the so-called silver salt photographic printing technique wherein the print station 1B effects exposure of the print paper P with a photographic image at the print exposing unit 14 having the exposure engine and then develops a plurality of developing operations of this exposed print paper P. Needless to say, in this invention, the print station 1B is not limited to such type. Instead, various photographic printing systems such as an ink jet printing for forming an image by jetting ink on to a film or a paper, a heat transfer printing method using a heat-sensitive sheet, etc. can be employed

The invention claimed is:

1. An image processing method for resizing image data to a determined desired magnification, the method comprising the steps of:
   determining a first reduction ratio less than 1, an expansion ratio more than 1, and a second reduction ratio less than 1, wherein a product of the first reduction ratio, the expansion ratio, and the second reduction ratio represents the determined desired magnification;
   reducing the image data by the first reduction ratio by using an averaging operation;
   expanding the resultant reduced image data by the expansion ratio by using an interpolating operation; and
   reducing the resultant expanded image data by the second reduction ratio by using an averaging operation, thereby minimizing occurrence of a moiré phenomenon.

2. The image processing method according to claim 1, wherein said first reduction ratio is 1/N1 (N1 is a natural number), said second reduction ratio is 1/N2 (N2 is a natural number) and said expansion ratio is R=M×N1×N2.

3. The image processing method according to claim 1, wherein values of said fast reduction ratio, said expansion ratio and said second reduction ratio converted from the determined desired magnification are tabulated in advance.

4. A computer-readable medium comprising computer-executable instructions for resizing image data, said computer-executable instructions being for:
   determining a magnification for resizing image data;
   determining a first reduction ratio less than 1, an expansion ratio more than 1, and a second reduction ratio less than 1, wherein a product of the first reduction ratio, the expansion ratio, and the second reduction ratio represents the determined desired magnification;

reducing the image data by the first reduction ratio by using an averaging operation;

expanding the resultant reduced image data by the expansion ratio by using an interpolating operation; and reducing the resultant expanded image data by the second reduction ratio by using an averaging operation, thereby minimizing occurrence of a moiré phenomenon.

5. A computer-readable medium comprising computer-executable instructions for resizing image data to a determined desired magnification, said instructions being for:

determining a first reduction ratio less than 1, an expansion ratio more than 1, and a second reduction ratio less than 1, wherein a product of the first reduction ratio, the expansion ratio, and the second reduction ratio represents the determined desired magnification;

reducing the image data by the first reduction ratio by using an averaging operation;

expanding the resultant reduced image data by the expansion ratio by using an interpolating operation; and reducing the resultant expanded image data by the second reduction ratio by using an averaging operation, thereby minimizing occurrence of a moiré phenomenon.

6. An image processing apparatus for resizing image data by a determined desired magnification, comprising:

an image data inputting section for inputting the image data;

a magnification determining section for determining a magnification for resizing the inputted image data;

a magnification converting section for determining a first reduction ratio less than 1, an expansion ratio more than 1, and a second reduction ratio less than 1, wherein a product of the first reduction ratio, the expansion ratio, and the second reduction ratio represents the determined desired magnification;

a first image reducing section for reducing the image data by the first reduction ratio by using an averaging operation;

an image expanding section for expanding the resultant reduced image data by the expansion ratio by using an interpolating operation; and a second image reducing section for reducing the resultant expanded image data by the second reduction ratio by using an averaging operation, thereby minimizing occurrence of a moiré phenomenon.

7. A photographic printing system having an image data inputting section for inputting photographic image data and a print outputting section for outputting a photographic image based on the inputted photographic image data in the form of a photographic print of a selected print size, said system comprising:

a magnification determining section for determining a magnification based on the image size of the inputted photographic image data and the print size;

a magnification converting section for determining a first reduction ratio less than 1, an expansion ratio more than 1, and a second reduction ratio less than 1, wherein a product of the first reduction ratio, the expansion ratio, and the second reduction ratio represents the determined desired magnification;

a first image reducing section for reducing the image data by the first reduction ratio by using an averaging operation;

an image expanding section for expanding the resultant reduced image data by the expansion ratio by using an interpolating operation; and a second image reducing section for reducing the resultant expanded image data by the second reduction ratio by using an averaging operation, thereby minimizing occurrence of a moiré phenomenon.

* * * * *

UNITED STATES PATENT AND TRADEMARK OFFICE
CERTIFICATE OF CORRECTION

PATENT NO.      : 7,602,523 B2                                              Page 1 of 1
APPLICATION NO. : 10/974665
DATED           : October 13, 2009
INVENTOR(S)     : Koichi Kugo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1182 days.

Signed and Sealed this

Fifth Day of October, 2010

David J. Kappos
*Director of the United States Patent and Trademark Office*